Patented Sept. 7, 1943

2,328,646

UNITED STATES PATENT OFFICE 2,328,646

POLYVINYL BUTYRAL SHEET MATERIAL

Emmette F. Izard, Kenmore, N. Y., assignor to E. I. du Pont de Nemours & Company, Wilmington, Del., a corporation of Delaware.

No Drawing. Application March 2, 1940, Serial No. 321,907

2 Claims. (Cl. 260—36)

This invention relates to thin transparent polyvinyl acetal sheet materials of high durability, flexibility and resistance to tear, and more particularly to polyvinyl butyral films softened with octadecanediol di-esters.

Quite a number of transparent sheet materials, for example regenerated cellulose and rubber hydrochloride, are now available in large quantities and such materials have recently become very popular for wrapping packages and for fashioning garments. The drawback to their wider use has been that once a tear is started (for example by a break in the edge, a puncture of the film or some other means), complete rupture very quickly and readily results by means of propagation of the tear. This has been particularly true of regenerated cellulose film. Even the perforations caused by a sewing needle start a tear, which in materials having low resistance to tearing once a tear is started, may be readily propagated, especially along the line of perforations produced by sewing. For this reason such materials cannot be satisfactorily used in fashioning articles in which a sewing operation is employed (for example shower curtains, rain coats, bridge table covers, umbrellas, parasols, etc.). Such sheet materials have found a somewhat wider use in the wrapping field because package wrappers usually present a continuous and unbroken surface. As a result, and in spite of the fact that wrapping materials used for packaging are frequently subjected to tear, it is possible to use a film that exhibits a very low resistance to tearing. Materials of this character have long been tolerated for reasons of economy and availability but there has always been a demand, particularly in the drygoods field (sheets, pillow cases, etc.) for a transparent sheet wrapping material having high tear resistance. As will be obvious, such a material is also highly desirable for the manufacture of fabricated products which have to be stitched or sewn.

This invention had for an object the production of films of great durability. A further object was to produce transparent films with high tear resistance and flexibility. Still further objects were to provide new and improved softening materials for sheets of polyvinyl acetal compositions and to provide new sheet materials for wrapping and garment fabrication purposes. A general advance in the art, and other objects which will appear hereinafter, are also contemplated.

It has now been found that thin transparent polyvinyl acetal films or sheets softened with octadecanediol di-esters and the like are sufficiently flexible and tear resistant to be suitable for the manufacture of wrapping materials, sewn garments, and the like.

Such films are prepared from dispersions or dopes comprising essentially the polyvinyl acetal resin, octadecanediol di-esters and solvent material. The dopes are spread upon a smooth surface in a thin layer and the solvents evaporated according to methods well known in the art.

From the following description and specific examples, in which are disclosed certain embodiments of the invention as well as details of what is believed to be the best mode for carrying out the invention, it will be apparent how the foregoing objects and related ends are accomplished. Parts are given by weight throughout the specification.

*Example I*

A dope was prepared consisting of 15.8% of polyvinyl butyral (hydroxyl 19%, butyral 80%, acetyl 1%), 4.2% octadecanediol-1:12-di-acetate, and 80% of methanol. This dope was spread upon glass plates in thin layers and the solvent methanol allowed to evaporate. Glass-clear, transparent film 0.001 inch thick resulted and was stripped from the glass surface. The film was found to be not only perfectly transparent, but exceptionally tough and durable, and did not exhibit the tendency (exhibited by the common thin films heretofore available) to tear when subjected to stitching. Raincoats fashioned in the usual manner from this material withstood ordinary usage for a considerable and satisfactory period of time. Material 0.0015 inch thick made in other runs was found to be excellent for men's raincoats.

*Example II*

A dope consisting of 17% of polyvinyl isobutyral (hydroxyl 14%, isobutyral 85%, acetyl 1%), 3% octadecanediol-1:12-di-propionate, and 80% of methanol, was cast in a continuous manner upon the polished surface of a large diameter drum. Upon evaporation of the solvent, a highly transparent and durable film resulted. This film was .001 inch thick, had a high tear resistance, and was vastly superior to similar films available heretofore under conditions of low temperatures. Material 0.0012 inch thick made in other runs was found to be very desirable for women's raincoats and capes.

Example III

A film was prepared from a dope consisting of 19% of polyvinyl benzal-butyral (hydroxyl 15%, benzal 25%, isobutyral 55%, acetyl 5%), 1% of octadecanediol-1:12-di-hexoate, and 80% of methanol. Upon evaporation of the solvent, a highly transparent and durable film was obtained which was resistant to sticking tears at all temperatures in the range —10° C. to well above room temperature. The film was not subject to deformation through plastic flow to any detrimental extent until a temperature of 100° C. had been reached.

Example IV

A film was prepared by evaporating the solvent from a composition consisting of 17% polyvinyl formal (hydroxyl 2%, formal 90%, acetyl 8%), 3% of octadecanediol-1:12-di-acetate and 80% solvent (benzene-methanol 60:40). The film was found to be extremely durable and not to tear readily under a wide variety of temperatures.

Example V

A dope consisting of:

| | Parts |
|---|---|
| Polyvinyl butyral | 6.3 |
| Polyvinyl isobutyral | 6.8 |
| Polyvinyl formal | 3.8 |
| Octadecanediol-1:12-di-butyrate | 3.1 |
| Methanol | 70.0 |
| Ethyl formate | 10.0 | was cast continuously on the polished surface of a rotating nickel cylinder ten feet in diameter. The volatile materials were evaporated, and the resulting film stripped from the surface of the casting wheel. The film, which had a thickness of .0013 inch, was very clear, could be satisfactorily sewed, and had excellent tear resistance.

Example VI

A dope consisting of:

| | Per cent |
|---|---|
| Polyvinyl butyral (Example I type [1]) | 5 |
| Alvar type of resin (hydroxyl 10%, acetal 80%, acetyl 10%) | 5 |
| Polyvinyl formal (Example IV type) | 5 |
| Octadecanediol-1:12-di-acetate | 3 |
| Methanol | 33 |
| Benzene | 49 |

[1] (That is, hydroxyl corresponding to 19% polyvinyl alcohol, butyral corresponding to 80% polyvinyl butyral and acetyl corresponding to 1% polyvinyl acetate.)

was cast continuously on the polished surface of a rotating nickel cylinder six feet in diameter. The volatile materials were evaporated, and the resulting film stripped from the surface of the casting wheel. The film, which had a thickness of .00088 inch, was very clear, could be satisfactorily sewed, and had excellent tear resistance.

Example VII

A film was prepared by evaporating the solvent from a composition consisting of 17% polyvinyl formal (hydroxyl 2%, formal 90%, acetyl 8%), 3% of octadecanediol-1:12-di-acetate, 64% methyl acetate, 2% water and 14% methanol. The film was found to be extremely durable and not to tear readily under a wide variety of temperatures.

The polyvinyl acetal type resins in general, such as, for example, polyvinyl formals, polyvinyl butyrals, polyvinyl iso-butyrals, polyvinyl benzals, and the alvar type of acetals (the polyvinyl acetals themselves), are suitable for use in this invention. The polyvinyl acetal component of the film may comprise mixtures of polyvinyl acetals and interpolymers from different acetal forming radicals. The straight polyvinyl butyrals are outstanding and constitute greatly preferred embodiments of the invention.

Although octadecanediol di-acetate gives superior results and is the preferred softener, certain related compounds are quite satisfactory and may be considered equivalents. Among these may be mentioned various esters of octadecanediol; for example, those formed from acetic, propionic, isobutyric, butyric, capric, caprylic, caproic, lauric, levulinic, glycolic, lactic, benzoic, benzoylbenzoic, chlorobenzoylbenzoic, hexahydrobenzoic, octahydracinnamic, cyclohexyl acetic, furoic and picolinic. As will be clear from this list of illustrative acids, the acid part of the ester may comprise mono-carboxylic acids in general and the aliphatic acids, aromatic acids and heterocyclic acids in particular. The aliphatic groups may be either branched or straight chain and may be substituted or unsubstituted, and may be saturated or unsaturated. The paraffinic acids and the naphthenic acids (such as those which are obtained in the petroleum industry), constitute very desirable sub-groups. In the interest of economy, commercially available mixtures may sometimes be used. A very satisfactory example of this class of materials is the higher straight and branched chain acid mixture corresponding to the higher alcohols obtained by the hydrogenation of carbon oxide under elevated temperatures and pressures. (See U. S. A. Patent 1,820,417.)

Some variation is also possible in the di-hydric alcohol. Instead of the octadecanediol-1:12, there may be used the tetradecanediol-7:8, dodecanediol-6:7, cetene glycol and hexadecanediol-1:2. The best results appear to be obtainable with di-hydric alcohols of 12 to 22 carbon atoms, inclusive. The manufacture of such alcohols is well known, type reactions being the hydrogenation of the corresponding hydroxy acid, hydration of the corresponding unsaturated mono-hydric alcohol (such as oleyl or erucyl) and peracetylation of suitable olefins.

This type of material acts as a softener in producing flexibility in polyvinyl acetal resins. The resulting films are non-tacky.

The most suitable solvents for use in connection with this invention are those which dissolve both the resins and the octadecanediol di-esters. Among these may be mentioned methanol, acetone and ethyl formate. Mixtures such as 60% methanol with 40% benzene, 80% methyl acetate with 20% methanol, and the like, are quite satisfactory.

For most purposes, 3% to 10% of the softener (based on the total weight of the film) is adequate but greater amounts may be used if desired. No advantage has been found for proportions exceeding 30%. A practical minimum is 1% but even smaller amounts may be employed for special purposes. Material to be used as a wrapping tissue with automatic machinery should contain less than 10% softener. When the film contains 30% softener, it is very limp and is not recommended for use in wrapping machines.

The thickness of the pellicle may, in accordance with common casting practice, be varied to suit particular needs. Most of the material prepared will have a thickness in the range of 0.0005 to 0.0022 of an inch. A thickness of about 0.00088 of an inch is suitable for most purposes, including, for example, sheet wrapping material. Material for the manufacture of garments such as raincoats and mittens and like uses is preferably about 0.001 inch thick. For ladies' raincoats, 0.0012 inch thickness and for men's raincoats 0.0015 inch thickness seems to be most suitable.

The present invention does not exclude the presence of small proportions of other film formers and softeners so long as the basic advance in the art is present.

Polyvinyl acetal films softened with octadecanediol di-esters are vastly superior to any other films available heretofore for certain purposes, such as those described above. They have a high resistance to tearing which makes them suitable for stitching or close sewing (at least 10 stitches per inch) in which long lines of perforations (such as are produced by a sewing machine) are particularly conducive to tearing. Furthermore, they are suitable where a product is to be perforated for the purpose of allowing entrance of fluid, either for ventilation or for the admission of liquid. For example, tea bags may be formed of the films of the sheet material of this invention by perforating and wrapping therein tea leaves or suitable extractable materials. In many cases it is desirable to perforate areas of sheeting in order to give ventilation to enclosed articles. It is also desirable to form windows or certain cut-out portions in wrappers which will not otherwise weaken the wrapper, as by tearing. The new material is admirably suited to such purposes.

It is highly desirable to have a transparent film which is highly flexible and which resembles in this respect the limpness and feel of fabric. Not only must the material have the necessary degree of flexibility, but it must be sufficiently tough and durable to subject it to folds and creases and continued flexing to approximate the durability of fabrics. In this respect, the transparent material of this invention is superior to other transparent materials heretofore available, and especially is this true when considered over a wide range of temperature, and relative humidity.

It is most important that these compositions used for transparent films shall be stable over long periods of time in order that durable and lasting articles may be fashioned therefrom. Many of the prior art materials have been most unsatisfactory in this respect. The compositions of the present invention give a film which is of lasting durability and not subject to deterioration which will result in unsightly discolorations and blemishes, as well as a weakening of the film.

Films of the present invention are superior to many other transparent films heretofore available in that they remain stable and undistorted at relatively high temperatures.

The above-noted advantages of the products and films of this invention cause it to be peculiarly well adapted to the fashioning of such articles of clothing as raincoats, in which the material must be not only weather-resistant and waterproof, but durable as regards wearing qualities and ability to be folded into small and compact bundles. In the fashioning of raincoats, it is desirable that the seams be formed by stitching and the great freedom from tearing, that this material exhibits, makes it particularly well adapted for such methods of fashioning. Another related use is that of parasol and umbrella coverings, which, in addition to requiring high tensile strength and durability in order to stand the stretching of the ribs, must be resistant to tearing and to the demands that stitching places upon the film, and also to deformation at relatively high temperatures which may be encountered in direct sunlight, as well as the detrimental influence of the ultraviolet rays of sunshine. In all of these respects, this material is unequalled and greatly superior to the materials available heretofore.

In the preceding paragraph and in the examples, the suitability of polyvinyl butyral film softened with octadecanediol-1:12 di-acetate for the manufacture of raincoats, shower curtains, bridge table covers, umbrellas, parasols, and the like, has been described in considerable detail. The material is also extremely valuable as a wrapping tissue, for example in the wrapping of sheets and pillow cases. The advantages of a wrapping tissue having a high resistance to tear are obvious, since many rewrapped jobs are eliminated and because snags in the film do not result in the complete tearing off of the wrapper.

In addition to the advantageous properties mentioned above may be added that of a completely non-tacky surface which will not adhere to other surfaces when subjected to pressure, nor is the surface affected by many common liquids and materials which may come in contact with it.

As many apparently widely different embodiments of this invention may be made without departing from the spirit and scope thereof, it is to be understood that I do not limit myself to the specific embodiments thereof except as defined in the appended claims.

I claim:

1. A polyvinyl butyral sheet wrapping material softened with 3%–10% mono-carboxylic acid di-ester of octadecanediol 1:12.

2. The product of claim 1 when the softener is octadecanediol-1:12-di-acetate.

EMMETTE F. IZARD.